United States Patent
Li

(10) Patent No.: US 12,308,974 B2
(45) Date of Patent: May 20, 2025

(54) HYBRID AUTOMATIC REPEAT REQUEST-ACKNOWLEDGEMENT INFORMATION TRANSMISSION METHOD AND APPARATUS, AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 352 days.

(21) Appl. No.: 17/911,979

(22) PCT Filed: Mar. 18, 2020

(86) PCT No.: PCT/CN2020/080068
§ 371 (c)(1),
(2) Date: Sep. 15, 2022

(87) PCT Pub. No.: WO2021/184270
PCT Pub. Date: Sep. 23, 2021

(65) Prior Publication Data
US 2023/0144815 A1   May 11, 2023

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1607* (2013.01); *H04L 1/1854* (2013.01); *H04W 72/232* (2023.01)

(58) Field of Classification Search
CPC ... H04L 1/1812; H04L 1/1854; H04W 72/232
See application file for complete search history.

(56) References Cited

U.S. PATENT DOCUMENTS

| 2021/0136781 A1* | 5/2021 | Hosseini | H04W 72/569 |
| 2022/0377813 A1* | 11/2022 | Wang | H04W 72/23 |

(Continued)

FOREIGN PATENT DOCUMENTS

| CN | 106797287 A | 5/2017 |
| CN | 110557231 A | 12/2019 |

(Continued)

OTHER PUBLICATIONS

Qualcomm Incorporated: "Enhancements to Scheduling and HARQ operation for NR-U", 3GPP TSG RAN WG1 Meeting #98bis R1-1911099, Oct. 20, 2019.

(Continued)

*Primary Examiner* — Won Tae C Kim
(74) *Attorney, Agent, or Firm* — Volpe Koenig

(57) ABSTRACT

A hybrid automatic repeat request-acknowledgment (HARQ-ACK) information transmission method, the method includes: receiving downlink control information sent by a base station, where the downlink control information contains a priority of HARQ-ACK information of a corresponding physical downlink shared channel (PDSCH); determining a target feedback mode used for performing HARQ-ACK feedback on the PDSCH corresponding to the downlink control information according to the priority of the HARQ-ACK; and transmitting corresponding HARQ-ACK feedback information to the base station according to the target feedback mode.

18 Claims, 5 Drawing Sheets

(51) Int. Cl.
*H04L 1/1829* (2023.01)
*H04W 72/232* (2023.01)

(56) References Cited

U.S. PATENT DOCUMENTS

2022/0416953 A1* 12/2022 Li .................... H04L 1/1896
2023/0113163 A1* 4/2023 Takahashi ............ H04W 72/04
714/748

FOREIGN PATENT DOCUMENTS

| CN | 110708146 A | 1/2020 |
| EP | 3096579 A1 | 11/2016 |
| WO | 2021/184270 A1 | 9/2021 |

OTHER PUBLICATIONS

International Search Report, PCT/CN2020/080068 dated Dec. 16, 2020 (4 pgs.).

* cited by examiner

HYBRID AUTOMATIC REPEAT REQUEST-ACKNOWLEDGEMENT INFORMATION TRANSMISSION METHOD AND APPARATUS, AND STORAGE MEDIUM

CROSS REFERENCE TO RELATED APPLICATION

The present appliation is a U.S. National Stage of International Application No. PCT/CN2020/080068, filed on Mar. 18, 2020, the contents of all of which are incorporated herein by reference in their entireties for all purposes.

BACKGROUND

In a wireless communication system, a hybrid automatic repeat reQuest (HARQ) is a technology that combines feed-forward error correction (FEC) and ARQ to decide whether to send data again.

In the 5th generation mobile communication (5G), two simultaneous HARQ-ACK feedback modes are provided, namely an enhanced dynamic HARQ-ACK feedback mode and one-shot HARQ-ACK feedback mode. The enhanced dynamic HARQ-ACK feedback mode has low feedback delay but large signaling overhead; but the one-shot HARQ-ACK feedback mode has high feedback delay but small signaling overhead.

SUMMARY

According to a first aspect of examples of the disclosure, a hybrid automatic repeat request-acknowledgment information transmission method is provided, executed by a terminal, and including:
  receiving downlink control information (DCI) sent by a base station, where the downlink control information contains a priority of hybrid automatic repeat request-acknowledgment (HARQ-ACK) information of a corresponding physical downlink shared channel (PDSCH);
  determining a target feedback mode used for performing HARQ-ACK feedback on the physical downlink shared channel (PDSCH) corresponding to the downlink control information according to the priority of the HARQ-ACK; and
  transmitting corresponding HARQ-ACK feedback information to the base station according to the target feedback mode.

According to a second aspect of examples of the disclosure, a hybrid automatic repeat request-acknowledgment information transmission method is provided, executed by a base station, and including:
  sending downlink control information to a terminal, where the downlink control information contains a priority of hybrid automatic repeat request-acknowledgment (HARQ-ACK) information of a corresponding physical downlink shared channel (PDSCH); and
  receiving HARQ-ACK feedback information transmitted by the terminal for the PDSCH corresponding to the downlink control information according to a target feedback mode, where the target feedback mode is determined according to the priority of the HARQ-ACK.

According to a third aspect of examples of the disclosure, a hybrid automatic repeat request-acknowledgment information transmission apparatus is provided, applied to a terminal, and including:
  a processor; and
  a memory for storing an executable instruction of the processor; where
  the processor is configured to:
  receive downlink control information sent by a base station, where the downlink control information contains a priority of hybrid automatic repeat request-acknowledgment (HARQ-ACK) information of a corresponding physical downlink shared channel (PDSCH);
  determine a target feedback mode used for performing HARQ-ACK feedback on the physical downlink shared channel (PDSCH) corresponding to the downlink control information according to the priority of the HARQ-ACK; and
  transmit corresponding HARQ-ACK feedback information to the base station according to the target feedback mode.

According to a fourth aspect of examples of the disclosure, a hybrid automatic repeat request-acknowledgment information transmission apparatus is provided, applied to a base station, and including:
  a processor, and a memory for storing an executable instruction of the processor; where
  the processor is configured to:
  send downlink control information to a terminal, where the downlink control information contains a priority of hybrid automatic repeat request-acknowledgment (HARQ-ACK) information of a corresponding physical downlink shared channel (PDSCH); and
  receive HARQ-ACK feedback information transmitted by the terminal for the PDSCH corresponding to the downlink control information according to a target feedback mode, where the target feedback mode is determined according to the priority of the HARQ-ACK.

According to a fifth aspect of examples of the disclosure, a non-transitory computer-readable storage medium is provided, where the non-transitory computer-readable storage medium contains an executable instruction, and a processor in a base station calls the executable instruction to implement the hybrid automatic repeat request-acknowledgment information transmission method according to the above first aspect or any optional solution of the first aspect.

According to a sixth aspect of examples of the disclosure, a non-transitory computer-readable storage medium is provided, where the non-transitory computer-readable storage medium contains an executable instruction, and a processor in a terminal calls the executable instruction to implement the hybrid automatic repeat request-acknowledgment information transmission method according to the above second aspect or any optional solution of the second aspect.

It should be understood that the above general description and the following detailed description are merely illustrative and explanatory, and cannot limit the disclosure.

BRIEF DESCRIPTION OF THE DRAWINGS

Accompanying drawings here, which are incorporated in and constitute a part of this specification, illustrate examples consistent with the disclosure and together with the specification serve to explain the principles of the disclosure.

DETAILED DESCRIPTION

Figure 1:
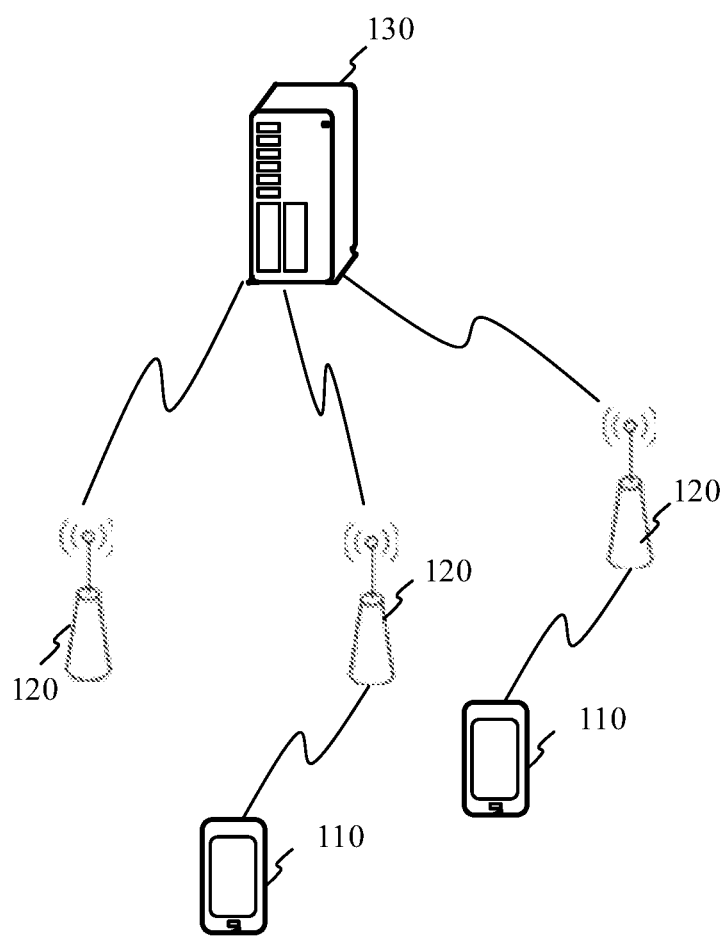
FIG. 1 is a schematic diagram of an implementation environment provided according to an example.

Examples will be described in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure. On the contrary, they are merely examples of an apparatus and method consistent with some aspects of the disclosure as detailed in the appended claims.

It should be understood that "several" mentioned herein refers to one or more, and "a plurality of" refers to two or more. "And/or" describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship.

The disclosure relates to the technical field of wireless communications, in particular to a hybrid automatic repeat request-acknowledgment information transmission method and apparatus, and a storage medium.

Radio spectrum resources are a kind of limited and non-renewable natural resources. Hence, every country has a special management agency for radio spectrum and issues special policies and regulations to achieve unified planning and management of the radio spectrum. At present, most countries manage the spectrum by adopting a fixed spectrum allocation strategy, that is, spectrum resources are managed by government competent departments and allocated to fixed authorized users, which can ensure that excessive mutual interference are avoided between users and the spectrum resources are utilized better. At present, the spectrum resources may be divided into two categories, namely a licensed spectrum and an unlicensed spectrum.

The licensed spectrum is strictly limited and protected, and merely accessed by licensed users and their compliant devices, and the users usually need to pay for it. At present, important departments such as public security, railways, civil aviation, radio and television, and telecommunications all have a certain amount of licensed frequency spectrum. The communication of devices in these departments is run on their licensed frequency spectrum. Especially in a telecommunications industry, mobile phones we use every day realize communication by using the licensed spectrum owned by an operator, and major operators all have dedicated frequency bands licensed by radio management units or departments of their respective countries to ensure that public mobile communication is not interfered.

The unlicensed spectrum is a spectrum that can be accessed and used by devices meeting certain specifications and standards, but it needs to be ensured that other users are not interfered. Typically, wireless fidelity (Wi-Fi), Bluetooth (BT) and other communication technologies are transmitted through the unlicensed spectrum. In addition, the Radio communication Bureau of International Communications Union has defined an industrial scientific medical (ISM) frequency band, which is mainly open to three types of institutions: industry, science, and medicine without authorization and permission. Certainly, it also needs to comply with a certain transmission power, and cannot cause interference to other frequency bands.

A hybrid automatic repeat request (HARQ) uses an FEC technology at a receiving end to correct the part of all errors that can be corrected. Through the HARQ, the receiving end judges a data packet that cannot be corrected by error detection, discards the data packet that cannot be corrected, and requests a transmitting end to resend the same data packet.

In a 5G new radio (NR) system, two feedback modes of HARQ-ACK information are designed for NR-Unlicensed (NR-U, an NR unlicensed spectrum).

One is an enhanced dynamic HARQ-ACK feedback mode, which is basically the same as R15 dynamic codebook (a dynamic HARQ-ACK codebook, that is, a Type 2 HARQ-ACK codebook) feedback. DCI that schedules a PDSCH designates a PUCCH resource that carries the HARQ-ACK information of the PDSCH through a PRI/K1/TPC domain. One bit in the DCI is used to indicate a group number of the PDSCH scheduled by the DCI, the HARQ-ACKs of different groups of PDSCHs correspond to different HARQ-ACK codebooks, and there are two groups of PDSCHs in total. The enhanced dynamic HARQ-ACK feedback mode may designate a PUCCH resource for one or more scheduled PDSCHs without generating additional information transmission overhead, so it is suitable for timely and fast feedback of a single PDSCH.

The other is a one-shot HARQ-ACK feedback mode, which is a semi-static feedback mode. User equipment (UE) needs to feedback HARQ-ACK information of all configured HARQ processes (whether actually scheduled or not scheduled) at one time. For example, it is assumed that a base station configures 16 HARQ processes for the UE, in response to determining that the UE is triggered to feed back one-shot HARQ-ACK information, the UE needs to feed back the HARQ-ACK information of all the 16 processes. In response to determining that some HARQ processes are not scheduled, the UE will feed back the corresponding HARQ-ACK information when the processes were used last time or feed back a default value, such as NACK (the specific situation depends on base station configuration). For the UE configured with the one-shot HARQ-ACK feedback mode, 1 bit in DCI 1_1 sent to the UE to schedule the PDSCH is used to judge whether to trigger one-shot HARQ-ACK feedback.

The one-shot HARQ-ACK feedback mode is suitable for feeding back the plurality of PDSCHs (less than or equal to the total number of HARQ processes) in a concentrated mode because it needs to feed back all the HARQ processes at one time, or otherwise there will be a large information overhead.

Certainly, the above enhanced dynamic HARQ-ACK feedback mode may also be used to feed back the plurality of PDSCHs in a concentrated mode. However, in a situation of performing feedback on the plurality of PDSCHs in the concentrated mode, compared with the one-shot HARQ-ACK feedback mode, the enhanced dynamic HARQ-ACK feedback mode is more prone to causing an HARQ-ACK information error due to DCI missed detection.

In the 5G system, there is a service type that requires high reliability and low delay, namely an ultra reliability low latency (URLLC) service. There is another service type that does not require such high reliability and low delay, but will require a larger data transmission rate, namely, an enhanced mobile broadband (eMBB) service.

For the URLLC service, its HARQ-ACK information needs to be transmitted as soon as possible to reduce delay between the PDSCH and HARQ-ACK feedback, so as to reduce the overall data transmission delay. For the eMBB service, its HARQ-ACK feedback does not strictly require low delay, and the HARQ-ACK information of the plurality of PDSCHs before and after a time domain may be transmitted together in a centralized mode to improve resource utilization efficiency.

For the same UE, it is a common scenario to have both the URLLC service and the eMBB service. In order to support flexible multiplexing of the two services, the HARQ-ACK codebook is divided into two different priorities, and a codebook with a high priority can be transmitted preferentially (for example, in response to determining that two PUCCH channels carrying HARQ-ACK information with different priorities overlap in the time domain, HARQ-ACK information with the high priority is transmitted, and HARQ-ACK information with a low priority is discarded).

In response to determining that the URLLC service is deployed on the unlicensed frequency band, in order to support flexible multiplexing with the eMBB service, the HARQ-ACK codebook with the two different priorities should be supported as well. For example, for the enhanced dynamic HARQ-ACK feedback mode, a 1-bit PDSCH group number in the above DCI is reused, and in addition to indicating the corresponding PDSCH group number, priority information of the HARQ-ACK codebook is further attached. For example, in response to determining that PDSCH group ID=1, it indicates that its corresponding HARQ-ACK is the high priority; and in response to determining that PDSCH group ID=0, it indicates that its corresponding HARQ-ACK is the low priority. Certainly, the priority of the HARQ-ACK codebook may also be indicated by other information in the DCI. For example, different RNTIs are used to indicate different HARQ-ACK codebook priorities.

However, solutions shown in subsequent examples of the present application provide a method to flexibly select, in a terminal that simultaneously supports the two feedback modes, an appropriate feedback mode to perform HARQ-ACK feedback, so as to consider feedback delay requirements of different services and a resource utilization rate.

FIG. 1 is a schematic diagram of an implementation environment involved in a hybrid automatic repeat request-acknowledgment information transmission method shown according to a part of examples. As shown in FIG. 1, the implementation environment may include a plurality of terminals 110 and base stations 120.

The terminal 110 is a wireless communication device that supports various wireless access technologies. For example, the terminal 110 may support a cellular mobile communication technology, for example, a fifth-generation mobile communication technology. Alternatively, the terminal 110 may also support a next-generation mobile communication technology of the 5G technology.

For example, the terminal 110 may also be a user terminal device, such as a mobile phone (or called a "cellular" phone) and a computer with a mobile terminal, for example, the terminal may be portable, pocket-sized, hand-held, computer-built or vehicle-mounted mobile apparatuses. For example, the terminal may be a Station (STA), a subscriber unit, a subscriber station, a mobile station, a mobile, a remote station, an access point, a remote terminal, an access terminal, a user apparatus (user terminal), a user agent, a user device, or UE. Specifically, for example, the user device 210 may be the mobile terminal such as a smartphone, a tablet computer, and an electronic book reader, or may be a smart wearable device such as smart glasses, a smart watch, or a smart bracelet.

Alternatively, the terminal 110 may be a vehicle-mounted communication device, for example, a trip computer with a wireless communication function, or a wireless communication device externally connected to the trip computer.

Alternatively, the terminal 110 may also be a roadside device, for example, may be a street lamp, a signal lamp, or other roadside devices with a wireless communication function.

The base station 120 may be a network-side device in the wireless communication system. The wireless communication system may also be the 5G system, also called a new radio (NR) system. Alternatively, the wireless communication system may also be a next-generation system of the 5G system.

The base station 120 may be a base station (gNB) that adopts a centralized distributed architecture in the 5G system. In response to determining that the base station 120 adopts the centralized distributed architecture, the base station usually includes a central unit (CU) and at least two distributed units (DU). The central unit is provided with protocol stacks of a packet data convergence protocol (PDCP) layer, a radio link control (RLC) protocol layer, and a media access control (MAC) layer; and the distributed unit is provided with a physical (PHY) layer protocol stack. The specific implementation of the base station 120 is not limited in the example of the disclosure.

A wireless connection may be established between the base station 120 and the terminal 110 through a wireless radio. The wireless radio is a wireless radio based on the 5th generation mobile communication network technology (5G) standard, for example, the wireless radio is a new radio; alternatively, the wireless radio may also be a wireless radio based on a next generation of mobile communication network technology standard of 5G.

In some examples, the above wireless communication system may further contain a network management device 130.

The plurality of base stations 120 are respectively connected with the network management device 130. The network management device 130 may be a core network device in the wireless communication system. For example, the network management device 130 may be a mobility management entity (MME) in an evolved packet core (EPC) network. Alternatively, the network management device may also be other core network devices, such as a serving gateway (SGW), a public data network gateway (PGW), a policy and charging rules function (PCRF) or a home subscriber server (HSS). An implementation form of the network management device 130 is not limited in the example of the disclosure.

Figure 2:
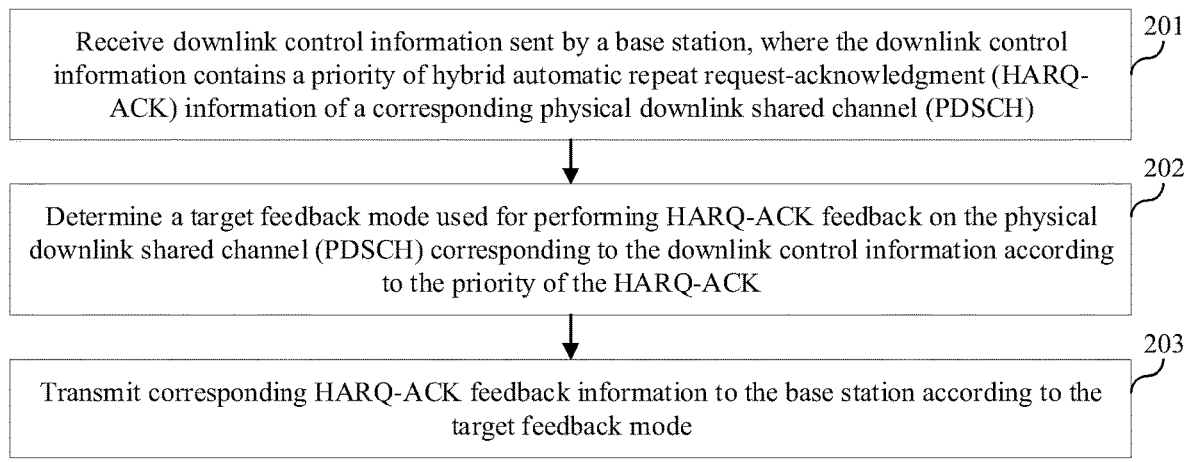
FIG. 2 is a flow diagram of a hybrid automatic repeat request-acknowledgment information transmission method shown according to an example.

FIG. 2 is a flow diagram of a hybrid automatic repeat request-acknowledgment information transmission method shown according to an example. The hybrid automatic repeat request response information transmission method may be executed by a terminal. For example, the terminal may be the terminal 110 in the implementation environment shown in FIG. 1. As shown in FIG. 2, the method may include the following steps.

In step 201, downlink control information sent by a base station is received, where the downlink control information contains a priority of hybrid automatic repeat request-acknowledgment (HARQ-ACK) information of a corresponding physical downlink shared channel (PDSCH).

In step 202, a target feedback mode used for performing HARQ-ACK feedback on the physical downlink shared channel (PDSCH) corresponding to the downlink control information is determined according to the priority of the HARQ-ACK.

In some examples, the HARQ-ACK feedback mode may include an enhanced dynamic HARQ-ACK feedback mode and a one-shot HARQ-ACK feedback mode.

In a possible implementation, the terminal may determine the enhanced dynamic HARQ-ACK feedback mode as the above target feedback mode in response to determining that the priority of the HARQ-ACK is high, so as to reduce HARQ-ACK feedback delay; and the terminal may determine the one-shot HARQ-ACK feedback mode as the above target feedback mode in response to determining that the priority of the HARQ-ACK is low, so as to save system resources.

In step S203, corresponding HARQ-ACK feedback information is transmitted to the base station according to the target feedback mode.

In a possible implementation, determining the target feedback mode used for performing HARQ-ACK feedback on the physical downlink shared channel (PDSCH) corresponding to the downlink control information according to the priority of the HARQ-ACK includes:

the target feedback mode is determined according to the priority of the HARQ-ACK and an information format of the downlink control information.

The information format of the downlink control information is used to indicate whether the downlink control information triggers one-shot HARQ-ACK feedback.

In a possible implementation, determining the target feedback mode according to the priority of the HARQ-ACK and the information format of the downlink control information includes:

the target feedback mode is determined as the enhanced dynamic HARQ-ACK feedback mode in response to determining that the priority of the HARQ-ACK is a high priority and the information format of the downlink control information indicates that the corresponding downlink control information does not trigger one-shot HARQ-ACK feedback.

In a possible implementation, determining the target feedback mode according to the priority of the HARQ-ACK and the information format of the downlink control information includes:

the target feedback mode is determined as the one-shot HARQ-ACK feedback mode in response to determining that the priority of the HARQ-ACK is a high priority and the information format of the downlink control information indicates that the corresponding downlink control information triggers one-shot HARQ-ACK feedback.

In a possible implementation, determining the target feedback mode according to the priority of the HARQ-ACK and the information format of the downlink control information includes:

the target feedback mode is determined as the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band.

Receiving the downlink control information sent by the base station includes:

the downlink control information sent by the base station through the unlicensed frequency band is received.

Transmitting the corresponding HARQ-ACK feedback information to the base station according to the target feedback mode includes:

the corresponding HARQ-ACK feedback information is transmitted to the base station through the unlicensed frequency band according to the target feedback mode.

To sum up, according to the solution provided by the example of the disclosure, in response to receiving the DCI sent by the base station, the terminal may select the target feedback mode for sending the HARQ-ACK feedback information of the PDSCH corresponding to the DCI according to the priority of the HARQ-ACK indicated by the DCI. For example, for the PDSCH with the priority of the HARQ-ACK being high, the enhanced dynamic HARQ-ACK feedback mode is used to ensure low feedback delay. For the PDSCH with the priority of the HARQ-ACK being low, the one-shot HARQ-ACK feedback mode is used to reduce signaling occupation. That is to say, the solutions shown in the examples of the present application can flexibly select, in a terminal that simultaneously supports the two feedback modes, an appropriate feedback mode to perform HARQ-ACK feedback, and thus feedback delay requirements of different services and a resource utilization rate are considered.

Figure 3:
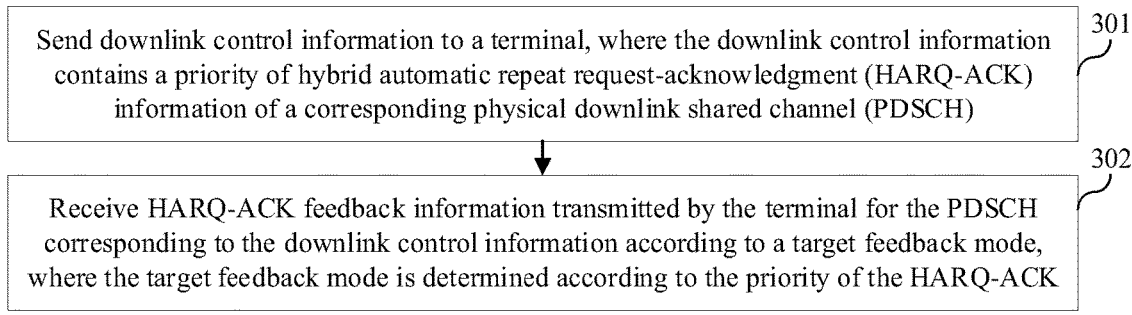
FIG. 3 is a flow diagram of a hybrid automatic repeat request-acknowledgment information transmission method shown according to an example.

FIG. 3 is a flow diagram of a hybrid automatic repeat request-acknowledgment information transmission method shown according to an example. The hybrid automatic repeat request response information transmission method may be executed by a base station. For example, the base station may be the base station 120 in the implementation environment shown in FIG. 1. As shown in FIG. 3, the method may include the following steps.

In step 301, downlink control information is sent to a terminal, where the downlink control information contains a priority of hybrid automatic repeat request-acknowledgment (HARQ-ACK) information of a corresponding physical downlink shared channel (PDSCH).

In step 302, HARQ-ACK feedback information transmitted by the terminal for the PDSCH corresponding to the downlink control information is received according to a target feedback mode, where the target feedback mode is determined according to the priority of the HARQ-ACK.

In some examples, the HARQ-ACK feedback mode may include an enhanced dynamic HARQ-ACK feedback mode and a one-shot HARQ-ACK feedback mode. In a possible implementation, the above target feedback mode may be the enhanced dynamic HARQ-ACK feedback mode in response to determining that the priority of the HARQ-ACK is high; and the above target feedback mode may be the one-shot HARQ-ACK feedback mode in response to determining that the priority of the HARQ-ACK is low.

In a possible implementation, the target feedback mode is the enhanced dynamic HARQ-ACK feedback mode in response to determining that the priority of the HARQ-ACK is a high priority and an information format of the downlink control information indicates that the corresponding downlink control information does not trigger one-shot HARQ-ACK feedback.

In a possible implementation, the target feedback mode is the one-shot HARQ-ACK feedback mode in response to determining that the priority of the HARQ-ACK is a high priority and the information format of the downlink control information indicates that the corresponding downlink control information triggers one-shot HARQ-ACK feedback.

In a possible implementation, the target feedback mode is the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band.

Sending the downlink control information to the terminal includes:
the downlink control information is sent to the terminal through the unlicensed frequency band.

Receiving the HARQ-ACK feedback information transmitted by the terminal for the PDSCH corresponding to the downlink control information according to the target feedback mode includes:
the HARQ-ACK feedback information transmitted by the terminal for the PDSCH corresponding to the downlink control information is received through the unlicensed frequency band according to the target feedback mode.

To sum up, according to the solution provided by the example of the disclosure, after the base station sends the DCI to the terminal, the terminal may select the target feedback mode for sending the HARQ-ACK feedback information of the PDSCH corresponding to the DCI according to the priority of the HARQ-ACK indicated by the DCI. Accordingly, the base station receives the HARQ-ACK feedback information sent by the terminal through the target feedback mode. For example, for the PDSCH with the priority of the HARQ-ACK being high, the enhanced dynamic HARQ-ACK feedback mode is used to ensure low feedback delay. For the PDSCH with the priority of the HARQ-ACK being low, the one-shot HARQ-ACK feedback mode is used to reduce signaling occupation. That is to say, the solutions shown in the examples of the present application can flexibly select, in a terminal that simultaneously supports the two feedback modes, an appropriate feedback mode to perform HARQ-ACK feedback, and thus feedback delay requirements of different services and a resource utilization rate are considered.

Figure 4:
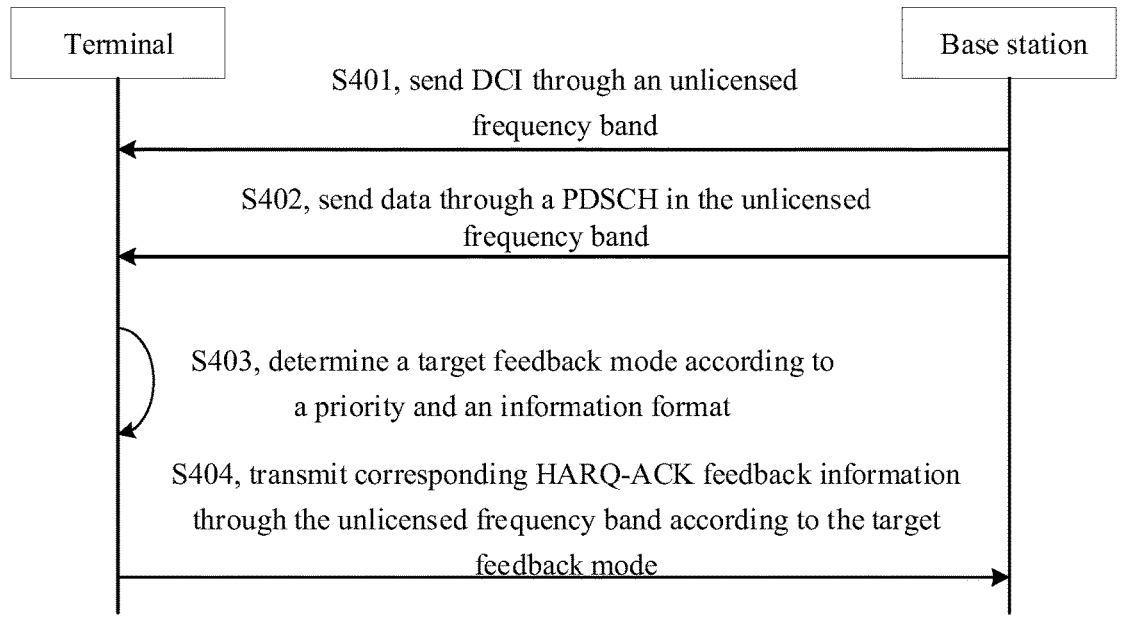
FIG. 4 is a flow diagram of a hybrid automatic repeat request-acknowledgment information transmission method shown according to an example.

FIG. 4 is a flow diagram of a hybrid automatic repeat request-acknowledgment information transmission method shown according to an example. The hybrid automatic repeat request response information transmission method may be executed by a terminal and a base station interactively. For example, the terminal may be the terminal 110 in the implementation environment shown in FIG. 1, and the base station may be the base station 120 in the implementation environment shown in FIG. 1. As shown in FIG. 4, the method may include the following steps.

In step 401, the base station sends downlink control information to the terminal through an unlicensed frequency band, and accordingly, the terminal receives the downlink control information sent by the base station through the unlicensed frequency band. The downlink control information contains a priority of hybrid automatic repeat request-acknowledgment (HARQ-ACK) information of a corresponding physical downlink shared channel (PDSCH).

In the example of the present application, in a process of data transmission between the base station and the terminal through the unlicensed frequency band, in response to determining that the base station needs to transmit downlink data to the terminal, a physical downlink control channel (PDCCH) on the unlicensed frequency band carries the above DCI.

In the example of the present application, the above DCI not only indicates the PDSCH corresponding to the to-be-transmitted downlink data to the terminal, but also carries the priority of HARQ-ACK of the corresponding PDSCH.

In a possible implementation, the priority of the HARQ-ACK of the above PDSCH may be indicated by a PDSCH group ID corresponding to the PDSCH. For example, in response to determining that the PDSCH group ID indicated by DCI=1, it indicates that the priority of the HARQ-ACK of the corresponding PDSCH is high. On the contrary, in response to determining that the PDSCH group ID indicated by the DCI=0, it indicates that the priority of the HARQ-ACK of the corresponding PDSCH is low.

In the example of the present application, since the terminal simultaneously supports the enhanced dynamic HARQ-ACK feedback mode and the one-shot HARQ-ACK feedback mode, the information format of the above DCI may be a specified information format, namely, a DCI 1_1 format.

That is to say, the information format of the downlink control information is used to indicate whether the downlink control information triggers one-shot HARQ-ACK feedback.

In step 402, the base station sends data to the terminal through the physical downlink shared channel (PDSCH) corresponding to the above DCI in the unlicensed frequency band; and accordingly, the terminal receives downlink data on the PDSCH in the unlicensed frequency band.

In the example of the disclosure, in response to determining that the base station transmits data to the terminal in a downlink mode, the terminal may receive the PDSCH on a downlink resource designated by the DCI, and receive and demodulate the data in the PDSCH. The physical downlink shared channel (PDSCH) corresponding to the DCI is transmitted based on the unlicensed frequency band.

In the example of the present application, the terminal may simultaneously support a variety of services of different demand types, such as a URLLC service and an eMBB service. Accordingly, in response to determining that the base station transmits downlink data to the terminal, service data of different types of services may be transmitted.

In step 403, the terminal determines the target feedback mode used for performing HARQ-ACK feedback on the PDSCH corresponding to the DCI according to the priority of the HARQ-ACK and the information format of the downlink control information.

In the example of the present application, a process for the terminal to determine the target feedback mode may include the following three situations.

1) The target feedback mode is determined as the enhanced dynamic HARQ-ACK feedback mode in response to determining that the priority of the HARQ-ACK is the high priority and the information format of the downlink control information indicates that the corresponding downlink control information does not trigger one-shot HARQ-ACK feedback.

In the example of the present application, for a service needing low latency, such as the URLLC service, feedback should be obtained as soon as possible. Hence, when scheduling such service, the base station may indicate through the DCI that the priority of the HARQ-ACK corresponding to its PDSCH group ID is high (e.g., PDSCH group ID=1). Accordingly, in response to determining that the DCI is received on a terminal side, the priority of the corresponding HARQ-ACK is parsed as high, and meanwhile one-shot HARQ-ACK feedback is not triggered, it may be determined that the HARQ-ACK feedback mode of the PDSCH indicated by the DCI is the enhanced dynamic HARQ-ACK feedback mode.

2) The target feedback mode is determined as the one-shot HARQ-ACK feedback mode in response to determining that the priority of the HARQ-ACK is the high priority and the information format of the downlink control information indicates that the corresponding downlink control information triggers one-shot HARQ-ACK feedback.

That is to say, in the example of the present application, there is a situation that DCI indicates that the priority of the HARQ-ACK corresponding to its PDSCH group ID is high (for example, PDSCH group ID=1), and meanwhile, the DCI format information triggers one-shot HARQ-ACK feedback, so the terminal is triggered to perform one-shot HARQ-ACK feedback on all configured HARQ processes including the current PDSCH. In this case, usually the PDSCH currently scheduled by the DCI is the last PDSCH in the actually scheduled PDSCH corresponding to a one-shot HARQ-ACK codebook. Even if the one-shot HARQ-ACK feedback mode is used, all the configured HARQ processes including the HARQ process corresponding to the current PDSCH will be fed back immediately, and no additional delay will be brought to the HARQ-ACK with the high priority. Hence, in this case, the terminal may determine the target feedback mode as the one-shot HARQ-ACK feedback mode.

On the other hand, the terminal determines the target feedback mode as the enhanced dynamic HARQ-ACK feedback mode in response to determining that the priority of the HARQ-ACK is the high priority and the information format of the downlink control information indicates that the corresponding downlink control information triggers one-shot HARQ-ACK feedback, and then the terminal will make an enhanced dynamic HARQ-ACK feedback for the current PDSCH separately. However, since the current DCI triggers one-shot HARQ-ACK feedback, the terminal further needs to perform one-shot HARQ-ACK feedback on all the configured HARQ processes including the HARQ process corresponding to the current PDSCH at the same time. The two kinds of feedback occur at the same time or adjacently, and both include feedback information for the current PDSCH, which leads to repeated transmission of the feedback information for the current PDSCH. However, the terminal determines that the target feedback mode is the one-shot HARQ-ACK feedback mode in response to determining that the priority of the HARQ-ACK is the high priority and the information format of the downlink control information indicates that the corresponding downlink control information triggers one-shot HARQ-ACK feedback, and then the terminal merely needs to perform one-shot HARQ-ACK feedback on all the configured HARQ processes including the HARQ process corresponding to the current PDSCH, which may avoid repeated transmission of the HARQ-ACK information of one PDSCH in the enhanced dynamic HARQ-ACK codebook and the one-shot HARQ-ACK codebook, and can reduce occupation of uplink control resources of a physical layer.

3) The target feedback mode is determined as the one-shot HARQ-ACK feedback mode in response to determining that the priority of the HARQ-ACK is the low priority.

In the example of the present application, in response to determining that the DCI indicates that the priority of the HARQ-ACK corresponding to its PDSCH group ID is low, the terminal may use the one-shot HARQ-ACK feedback mode to perform HARQ-ACK feedback on the PDSCH corresponding to the DCI.

In the example of the present application, for the service with the priority of HARQ-ACK being low, such as the eMBB service, there is usually no strict requirement on the delay of HARQ-ACK feedback. Hence, when transmitting such service, the base station may indicate through the DCI that the priority of the HARQ-ACK corresponding to its PDSCH group ID is low (for example, PDSCH group ID=0). Accordingly, the terminal determines that the priority of its HARQ-ACK is low after receiving the DCI, then terminal may temporarily not perform HARQ-ACK feedback on the PDSCH indicated by the DCI immediately, but determine the target feedback mode of the PDSCH as the one-shot HARQ-ACK feedback mode, so as to transmit the HARQ-ACK feedback information of the PDSCH through the one-shot HARQ-ACK feedback mode in response to determining that the plurality of configured HARQ processes end and the plurality of HARQ processes are fed back together.

In this way, for the services with low delay requirements, the one-shot HARQ-ACK feedback mode is used. On the one hand, the HARQ-ACK information of the plurality of PDSCHs can be fed back in a centralized mode, which improves a utilization efficiency of uplink control resources at a physical layer; and on the other hand, using the one-shot HARQ-ACK feedback mode may greatly reduce an impact of missed DCI detection on the HARQ-ACK feedback information, and improve a reliability of the HARQ-ACK information. Because the one-shot HARQ-ACK feedback mode is to feed back all the HARQ processes at one time, that is, the HARQ-ACK codebook of the feedback includes the HARQ-ACK information of all the HARQ processes, it may also contain the high-priority HARQ-ACK feedback information that has been fed back through the enhanced dynamic HARQ-ACK feedback mode before (in response to determining that the PDSCH corresponding to the HARQ-ACK with the high priority is scheduled in one or more HARQ processes). It may be understood that this situation is merely equivalent to providing a retransmission opportunity for the HARQ-ACK feedback information corresponding to the high-priority PDSCH, but does not mean that the HARQ-ACK feedback information corresponding to the high-priority PDSCH is transmitted depending on the one-shot HARQ-ACK feedback mode.

In the example of the present application, while scheduling the PDSCH for the terminal, the base station may also determine the target feedback mode of the terminal for the PDSCH according to the solution shown in step 403 above. That is to say, the base station may determine the target feedback mode as the enhanced dynamic HARQ-ACK feedback mode in response to determining that the priority of the HARQ-ACK is the high priority and the information format of the downlink control information indicates that the corresponding downlink control information does not trigger one-shot HARQ-ACK feedback. The base station may determine the target feedback mode as the one-shot HARQ-ACK feedback mode in response to determining that the priority of the HARQ-ACK is the high priority and the information format of the downlink control information indicates that the corresponding downlink control information triggers one-shot HARQ-ACK feedback. The base station may determine the target feedback mode as the one-shot HARQ-ACK feedback mode in response to determining that the priority of the HARQ-ACK is the low priority.

In step 404, the terminal transmits the corresponding HARQ-ACK feedback information to the base station through the unlicensed frequency band according to the target feedback mode. Accordingly, the base station receives the HARQ-ACK feedback information transmitted by the terminal for the PDSCH corresponding to the downlink control information through the unlicensed frequency band according to the target feedback mode.

In the example of the present application, in response to determining that the terminal transmits the corresponding HARQ-ACK feedback information to the base station through the unlicensed frequency band according to the determined target feedback mode, the base station may receive the HARQ-ACK feedback information through the unlicensed frequency band according to the determined target feedback mode.

Figure 5:
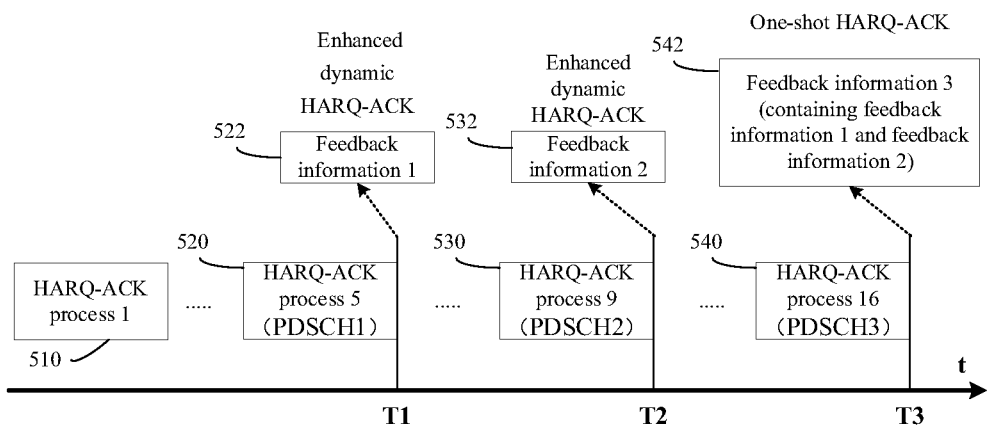
FIG. 5 is a schematic diagram of HARQ-ACK feedback involved in an example of the disclosure.

FIG. 5 shows a schematic diagram of HARQ-ACK feedback involved in an example of the present application. As shown in FIG. 5, the base station configures 16 HARQ processes (process 1 (510) through process 16 (540)) for the terminal. It is assumed that the base station respectively schedules a PDSCH (FIG. 5 respectively shows a PDSCH1 corresponding to an HARQ process 5 (520), a PDSCH2 corresponding to an HARQ process 9 (530), and a PDSCH3 corresponding to an HARQ process 16 (540)) with the priority of the HARQ-ACK being high from the HARQ process 5, the HARQ process 9 and the HARQ process 16 (where the HARQ process 16 is the last HARQ process), and the base station respectively schedules a PDSCH (not shown in FIG. 5) with the priority of the HARQ-ACK being low from all of other HARQ processes. In a communication process between the terminal and the base station, according to the DCI received in all the HARQ processes, it is determined that the PDSCH1 and the PDSCH2 are fed back through the enhanced dynamic HARQ-ACK feedback mode, and it is determined that the PDSCH3 and the PDSCHs scheduled in all of other HARQ processes are fed back through the one-shot HARQ-ACK feedback mode. That is to say, the DCI respectively corresponding to the above PDSCH1 and PDSCH2 does not trigger one-shot HARQ-ACK feedback, while the DCI corresponding to PDSCH3 triggers one-shot HARQ-ACK feedback. Accordingly, the terminal transmits HARQ-ACK feedback information 1 (522) corresponding to the PDSCH1 to the base station through the enhanced dynamic HARQ-ACK feedback mode at a feedback time T1 corresponding to the PDSCH1, transmits HARQ-ACK feedback information 2 (532) corresponding to the PDSCH2 to the base station through the enhanced dynamic HARQ-ACK feedback mode at a feedback time T2 corresponding to the PDSCH2, and transmits HARQ-ACK feedback information 3 (542) corresponding to all the PDSCHs in the 16 HARQ processes to the base station through the one-shot HARQ-ACK feedback mode at a feedback time 3 after the 16 HARQ processes. The HARQ-ACK feedback information 3 not only contains the PDSCH3 and HARQ-ACK feedback information respectively corresponding to the PDSCHs in all of other HARQ processes, but also contains the HARQ-ACK feedback information 1 and the HARQ-ACK feedback information 2 respectively corresponding to the PDSCH1 and the PDSCH2.

To sum up, according to the solution provided by the example of the disclosure, after the base station sends the DCI to the terminal, the terminal may select the target feedback mode for sending the HARQ-ACK feedback information of the PDSCH corresponding to the DCI according to the priority of the HARQ-ACK indicated by the DCI. Accordingly, the base station receives the HARQ-ACK feedback information sent by the terminal through the target feedback mode. For example, for the PDSCH with the priority of the HARQ-ACK being high, the enhanced dynamic HARQ-ACK feedback mode is used to ensure low feedback delay. For the PDSCH with the priority of the HARQ-ACK being low, the one-shot HARQ-ACK feedback mode is used to reduce signaling occupation. That is to say, the solutions shown in the examples of the present application can flexibly select, in a terminal that simultaneously supports the two feedback modes, an appropriate feedback mode to perform HARQ-ACK feedback, and thus feedback delay requirements of different services and a resource utilization rate are considered.

The following are the apparatus examples of the disclosure, which may be used to execute the method examples of the disclosure. For details not disclosed in the apparatus examples of the disclosure, please refer to the method examples of the disclosure.

Figure 6:
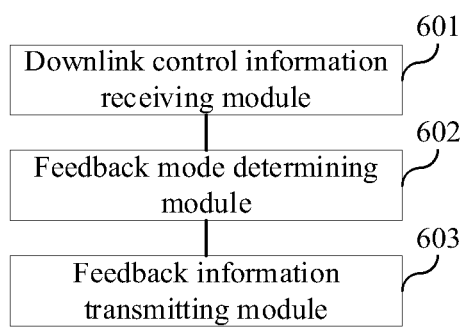
FIG. 6 is a block diagram of a hybrid automatic repeat request-acknowledgment information transmission apparatus shown according to an example.

FIG. 6 is a block diagram of a hybrid automatic repeat request-acknowledgment information transmission apparatus shown according to an example. As shown in FIG. 6, the hybrid automatic repeat request response information transmission apparatus may be implemented as all or part of the terminal 110 in the implementation environment shown in FIG. 1 by hardware or a combination of hardware and software, so as to execute the steps, executed by the terminal, in the example shown in FIG. 2 or FIG. 4. The hybrid automatic repeat request-acknowledgment information transmission apparatus may include:

a downlink control information receiving module 601, configured to receive downlink control information sent by a base station, where the downlink control information contains a priority of hybrid automatic repeat request-acknowledgment (HARQ-ACK) information of a corresponding physical downlink shared channel (PDSCH);

a feedback mode determining module 602, configured to determine a target feedback mode used for performing HARQ-ACK feedback on the physical downlink shared channel (PDSCH) corresponding to the downlink control information according to the priority of the HARQ-ACK; and a feedback information transmitting module 603, configured to transmit corresponding HARQ-ACK feedback information to the base station according to the target feedback mode.

In some examples, the HARQ-ACK feedback mode may include an enhanced dynamic HARQ-ACK feedback mode and a one-shot HARQ-ACK feedback mode. In a possible implementation, the feedback mode determining module 602 may determine the enhanced dynamic HARQ-ACK feedback mode as the above target feedback mode in response to determining that the priority of the HARQ-ACK is high; and the feedback mode determining module 602 may determine the one-shot HARQ-ACK feedback mode as the above target feedback mode in response to determining that the priority of the HARQ-ACK is low.

In a possible implementation,
the feedback mode determining module is configured to determine the target feedback mode according to the priority of the HARQ-ACK and an information format of the downlink control information.

The information format of the downlink control information is used to indicate whether the downlink control information triggers one-shot HARQ-ACK feedback.

In a possible implementation,
the feedback mode determining module is configured to determine, in response to determining that the priority of the HARQ-ACK is a high priority and the information format of the downlink control information indicates that the corresponding downlink control information does not trigger one-shot HARQ-ACK feedback, the target feedback mode as the enhanced dynamic HARQ-ACK feedback mode.

In a possible implementation,
the feedback mode determining module is configured to determine, in response to determining that the priority of the HARQ-ACK is a high priority and the information format of the downlink control information indicates that the corresponding downlink control information triggers one-shot HARQ-ACK feedback, the target feedback mode as the one-shot HARQ-ACK feedback mode.

In a possible implementation,
the feedback mode determining module is configured to determine the target feedback mode as the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band;
the downlink control information receiving module is configured to receive the downlink control information sent by the base station through the unlicensed frequency band; and
the feedback information transmitting module is configured to transmit the corresponding HARQ-ACK feedback information to the base station through the unlicensed frequency band according to the target feedback mode.

Figure 7:
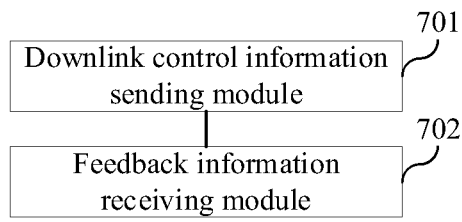
FIG. 7 is a block diagram of a hybrid automatic repeat request-acknowledgment information transmission apparatus shown according to an example.

FIG. 7 is a block diagram of a hybrid automatic repeat request-acknowledgment information transmission apparatus shown according to an example. As shown in FIG. 7, the hybrid automatic repeat request response information transmission apparatus may be implemented as all or part of the base station 120 in the implementation environment shown in FIG. 1 by hardware or a combination of hardware and software, so as to execute the steps, executed by the base station, in the example shown in FIG. 3 or FIG. 4. The hybrid automatic repeat request-acknowledgment information transmission apparatus may include:
a downlink control information sending module 701, configured to send downlink control information to a terminal, where the downlink control information contains a priority of hybrid automatic repeat request-acknowledgment (HARQ-ACK) information of a corresponding physical downlink shared channel (PDSCH); and a feedback information receiving module 702, configured to receive HARQ-ACK feedback information transmitted by the terminal for the PDSCH corresponding to the downlink control information according to a target feedback mode, where the target feedback mode is determined according to the priority of the HARQ-ACK.

In some examples, the HARQ-ACK feedback mode may include an enhanced dynamic HARQ-ACK feedback mode and a one-shot HARQ-ACK feedback mode. In a possible implementation, the above target feedback mode may be the enhanced dynamic HARQ-ACK feedback mode in response to determining that the priority of the HARQ-ACK is high; and the above target feedback mode may be the one-shot HARQ-ACK feedback mode in response to determining that the priority of the HARQ-ACK is low.

In a possible implementation,
the target feedback mode is the enhanced dynamic HARQ-ACK feedback mode in response to determining that the priority of the HARQ-ACK is a high priority and an information format of the downlink control information indicates that the corresponding downlink control information does not trigger one-shot HARQ-ACK feedback.

In a possible implementation,
the target feedback mode is the one-shot HARQ-ACK feedback mode in response to determining that the priority of the HARQ-ACK is a high priority and the information format of the downlink control information indicates that the corresponding downlink control information triggers one-shot HARQ-ACK feedback.

In a possible implementation,
the target feedback mode is the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band;
the downlink control information sending module is configured to send the downlink control information to the terminal through the unlicensed frequency band; and
the feedback information receiving module is configured to receive the HARQ-ACK feedback information transmitted by the terminal for the PDSCH corresponding to the downlink control information through the unlicensed frequency band according to the target feedback mode.

An example of the disclosure further provides a data transmission system. The system includes at least a terminal and a base station.

The terminal contains the hybrid automatic repeat request-acknowledgment information transmission apparatus provided by the above example as shown in FIG. 6.

The base station contains the hybrid automatic repeat request-acknowledgment information transmission apparatus provided by the above example as shown in FIG. 7.

It should be noted that, when the apparatus provided by the above example realizes its functions, merely the division of the above functional modules is used as an example for illustration. In practical application, the above functions may be allocated to be completed by the different functional modules according to actual needs. That is, a content structure of the device is divided into different functional modules to complete all or part of the functions described above.

As for the apparatus in the above examples, the specific modes for executing operations by all the modules have be described in the examples related to the method in detail, which is not illustrated in detail here.

An example of the disclosure provides a hybrid automatic repeat request-acknowledgment information transmission apparatus, which can implement all or part of the steps, executed by the terminal, in the above example shown in FIG. 2 or FIG. 4 of the disclosure. The hybrid automatic repeat request-acknowledgment information transmission apparatus includes: a processor, and a memory for storing an executable instruction of the processor.

The processor is configured to:
receive downlink control information sent by a base station, where the downlink control information contains a priority of hybrid automatic repeat request-acknowledgment (HARQ-ACK) information of a corresponding physical downlink shared channel (PDSCH);
determine a target feedback mode used for performing HARQ-ACK feedback on the physical downlink shared channel (PDSCH) corresponding to the downlink control information according to the priority of the HARQ-ACK; and
transmit corresponding HARQ-ACK feedback information to the base station according to the target feedback mode.

In some examples, the HARQ-ACK feedback mode may include an enhanced dynamic HARQ-ACK feedback mode and a one-shot HARQ-ACK feedback mode. In a possible implementation, the processor may determine the enhanced dynamic HARQ-ACK feedback mode as the above target feedback mode in response to determining that the priority of the HARQ-ACK is high; and the processor may determine the one-shot HARQ-ACK feedback mode as the above target feedback mode in response to determining that the priority of the HARQ-ACK is low.

In a possible implementation, determining the target feedback mode used for performing HARQ-ACK feedback on the physical downlink shared channel (PDSCH) corresponding to the downlink control information according to the priority of the HARQ-ACK includes:
the target feedback mode is determined according to the priority of the HARQ-ACK and an information format of the downlink control information.

The information format of the downlink control information is used to indicate whether the downlink control information triggers one-shot HARQ-ACK feedback.

In a possible implementation, determining the target feedback mode according to the priority of the HARQ-ACK and the information format of the downlink control information includes:
the target feedback mode is determined as the enhanced dynamic HARQ-ACK feedback mode in response to determining that the priority of the HARQ-ACK is a high priority and the information format of the downlink control information indicates that the corresponding downlink control information does not trigger one-shot HARQ-ACK feedback.

In a possible implementation, determining the target feedback mode according to the priority of the HARQ-ACK and the information format of the downlink control information includes:
the target feedback mode is determined as the one-shot HARQ-ACK feedback mode in response to determining that the priority of the HARQ-ACK is the high priority and the information format of the downlink control information indicates that the corresponding downlink control information triggers one-shot HARQ-ACK feedback.

In a possible implementation, determining the target feedback mode according to the priority of the HARQ-ACK and the information format of the downlink control information includes:
the target feedback mode is determined as the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band.

Receiving the downlink control information sent by the base station includes:
the downlink control information sent by the base station through the unlicensed frequency band is received.

Transmitting the corresponding HARQ-ACK feedback information to the base station according to the target feedback mode includes:
the corresponding HARQ-ACK feedback information is transmitted to the base station through the unlicensed frequency band according to the target feedback mode.

An example of the disclosure provides a hybrid automatic repeat request-acknowledgment information transmission apparatus, which can implement all or part of the steps, executed by the base station, in the above example shown in FIG. 3 or FIG. 4 of the disclosure. The hybrid automatic repeat request-acknowledgment information transmission apparatus includes: a processor, and a memory for storing an executable instruction of the processor.

The processor is configured to:
send downlink control information to a terminal, where the downlink control information contains a priority of hybrid automatic repeat request-acknowledgment (HARQ-ACK) information of a corresponding physical downlink shared channel (PDSCH); and
receive HARQ-ACK feedback information transmitted by the terminal for the PDSCH corresponding to the downlink control information according to a target feedback mode, where the target feedback mode is determined according to the priority of the HARQ-ACK.

In some examples, the HARQ-ACK feedback mode may include an enhanced dynamic HARQ-ACK feedback mode and a one-shot HARQ-ACK feedback mode. In a possible implementation, the above target feedback mode may be the enhanced dynamic HARQ-ACK feedback mode in response to determining that the priority of the HARQ-ACK is high; and the above target feedback mode may be the one-shot HARQ-ACK feedback mode in response to determining that the priority of the HARQ-ACK is low.

In a possible implementation,
the target feedback mode is the enhanced dynamic HARQ-ACK feedback mode in response to determining that the priority of the HARQ-ACK is a high priority and an information format of the downlink control information indicates that the corresponding downlink control information does not trigger one-shot HARQ-ACK feedback.

In a possible implementation,
the target feedback mode is the one-shot HARQ-ACK feedback mode in response to determining that the priority of the HARQ-ACK is the high priority and the information format of the downlink control information indicates that the corresponding downlink control information triggers one-shot HARQ-ACK feedback.

In a possible implementation,
the target feedback mode is the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band.

Sending the downlink control information to the terminal includes:
the downlink control information is sent to the terminal through the unlicensed frequency band.

Receiving the HARQ-ACK feedback information transmitted by the terminal for the PDSCH corresponding to the downlink control information according to the target feedback mode includes:
the HARQ-ACK feedback information transmitted by the terminal for the PDSCH corresponding to the downlink control information is received through the unlicensed frequency band according to the target feedback mode.

The foregoing mainly takes the terminal and the base station as examples to introduce the solutions provided by the examples of the disclosure. It may be understood that, in order to implement the above functions, a user device contains corresponding hardware structures and/or software modules for executing all the functions. Combining with modules and algorithm steps of each example described by the examples disclosed in the disclosure, the example of the disclosure can be implemented in a form of hardware or a combination of hardware and computer software. Whether a certain function is executed in a mode of hardware or a mode of the hardware driven by the computer software depends on a specific application and design constraint conditions of the technical solution. Those skilled in the art may use different methods to implement the described functions for each specific application, but such implementation should not be considered beyond the scope of the technical solution of the example of the disclosure.

Figure 8:
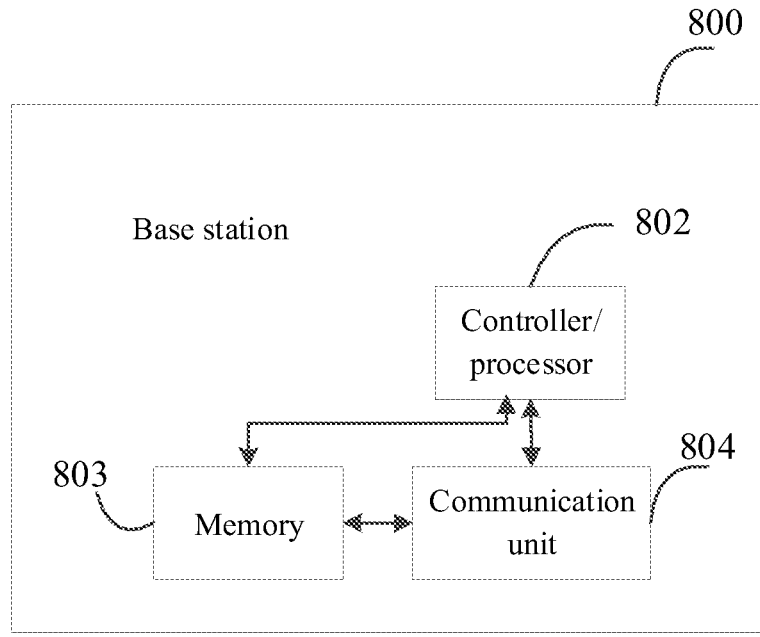
FIG. 8 is a schematic structural diagram of a base station shown according to an example.

FIG. 8 is a schematic structural diagram of a base station shown according to an example. The base station may be implemented as the base station in the system environment shown in FIG. 1 above.

The base station 800 includes a communication unit 804 and a processor 802. The processor 802 may also be a controller, represented in FIG. 8 as "a controller/processor 802". The communication unit 804 is used to support the base station to communicate with other network entities (such as other terminals or base stations).

Further, the base station 800 may further include a memory 803, and the memory 803 is used for storing program codes and data of the base station 800.

It may be understood that FIG. 8 merely shows a simplified design of the base station 800. In practical application, the base station 800 may contain any number of processors, controllers, memories, communication units, and the like, and all the base stations that can implement the examples of the disclosure fall within the protection scope of the examples of the disclosure.

Figure 9:
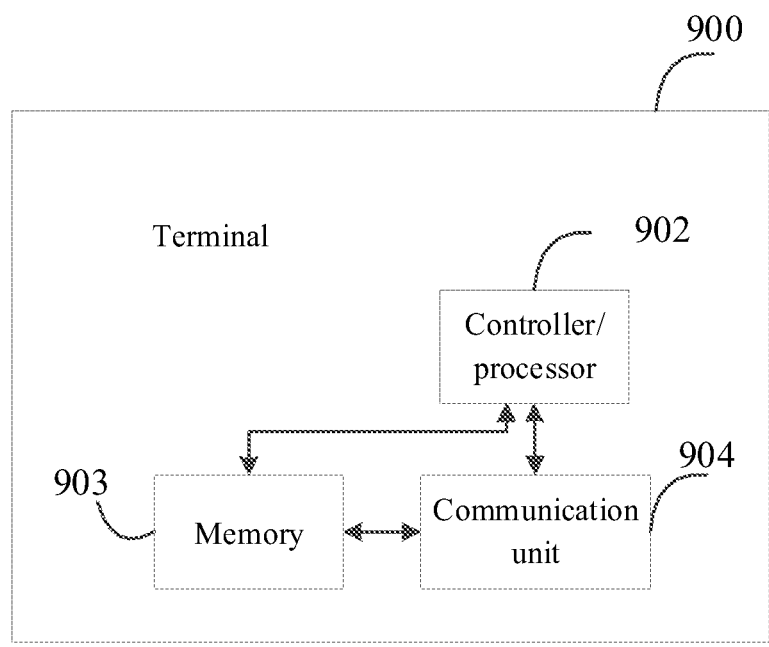
FIG. 9 is a schematic structural diagram of a terminal shown according to an example.

FIG. 9 is a schematic structural diagram of a terminal shown according to an example. The terminal may be implemented as the terminal in the system environment shown in FIG. 1 above.

The terminal 900 includes a communication unit 904 and a processor 902. The processor 902 may also be a controller, represented in FIG. 9 as "a controller/processor 902". The communication unit 904 is used to support the terminal to communicate with other network entities (such as other terminals or base stations).

Further, the terminal 900 may further include a memory 903, and the memory 903 is used for storing program codes and data of the terminal 900.

It may be understood that FIG. 9 merely shows a simplified design of the terminal 900. In practical application, the terminal 900 may contain any number of processors, controllers, memories, communication units, and the like, and all the terminals that can implement the examples of the disclosure fall within the protection scope of the examples of the disclosure.

Those skilled in the art should realize that, in one or more of the above examples, the functions described in the examples of the disclosure may be implemented by hardware, software, firmware, or any their combination. In response to being implemented in software, these functions may be stored in computer-readable medium or serve as one or more instructions or code on the computer readable medium to be transmitted. The computer-readable medium includes a computer storage medium and a communication medium, where the communication medium includes any medium that facilitates transfer of a computer program from one place to another. The storage medium may be any available medium that can be accessed by a general purpose or special purpose computer.

An example of the disclosure further provides a computer storage medium for storing computer software instructions used by the above terminal or base station, and containing a program designed for executing the above hybrid automatic repeat request-acknowledgment information transmission method.

According to a first aspect of examples of the disclosure, a hybrid automatic repeat request-acknowledgment information transmission method is provided, executed by a terminal, and including:
receiving downlink control information (DCI) sent by a base station, where the downlink control information contains a priority of hybrid automatic repeat request-acknowledgment (HARQ-ACK) information of a corresponding physical downlink shared channel (PDSCH);
determining a target feedback mode used for performing HARQ-ACK feedback on the physical downlink shared channel (PDSCH) corresponding to the downlink control information according to the priority of the HARQ-ACK; and
transmitting corresponding HARQ-ACK feedback information to the base station according to the target feedback mode.

In some examples, the HARQ-ACK feedback mode may include an enhanced dynamic HARQ-ACK feedback mode and a one-shot HARQ-ACK feedback mode. In a possible implementation, the enhanced dynamic HARQ-ACK feedback mode may be determined as the above target feedback mode in response to determining that the priority of the HARQ-ACK is high; and the one-shot HARQ-ACK feedback mode may be determined as the above target feedback mode in response to determining that the priority of the HARQ-ACK is low.

In a possible implementation, determining the target feedback mode used for performing HARQ-ACK feedback on the physical downlink shared channel (PDSCH) corresponding to the downlink control information according to the priority of the HARQ-ACK includes:

determining the target feedback mode according to the priority of the HARQ-ACK and an information format of the downlink control information; where the information format of the downlink control information is used to indicate whether the downlink control information triggers one-shot HARQ-ACK feedback.

In a possible implementation, determining the target feedback mode according to the priority of the HARQ-ACK and the information format of the downlink control information includes:

determining, in response to determining that the priority of the HARQ-ACK is a high priority and the information format of the downlink control information indicates that the corresponding downlink control information does not trigger one-shot HARQ-ACK feedback, the target feedback mode as the enhanced dynamic HARQ-ACK feedback mode.

In a possible implementation, determining the target feedback mode according to the priority of the HARQ-ACK and the information format of the downlink control information includes:

determining, in response to determining that the priority of the HARQ-ACK is a high priority and the information format of the downlink control information indicates that the corresponding downlink control information triggers one-shot HARQ-ACK feedback, the target feedback mode as the one-shot HARQ-ACK feedback mode.

In a possible implementation, determining the target feedback mode according to the priority of the HARQ-ACK and the information format of the downlink control information includes:

determining the target feedback mode as the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band;

receiving the downlink control information sent by the base station includes:

receiving the downlink control information sent by the base station through the unlicensed frequency band; and transmitting the corresponding HARQ-ACK feedback information to the base station according to the target feedback mode includes:

transmitting the corresponding HARQ-ACK feedback information to the base station through the unlicensed frequency band according to the target feedback mode.

According to a second aspect of examples of the disclosure, a hybrid automatic repeat request-acknowledgment information transmission method is provided, executed by a base station, and including:

sending downlink control information to a terminal, where the downlink control information contains a priority of hybrid automatic repeat request-acknowledgment (HARQ-ACK) information of a corresponding physical downlink shared channel (PDSCH); and receiving HARQ-ACK feedback information transmitted by the terminal for the PDSCH corresponding to the downlink control information according to a target feedback mode, where the target feedback mode is determined according to the priority of the HARQ-ACK.

In some examples, the HARQ-ACK feedback mode may include an enhanced dynamic HARQ-ACK feedback mode and a one-shot HARQ-ACK feedback mode. In a possible implementation, the above target feedback mode may be the enhanced dynamic HARQ-ACK feedback mode in response to determining that the priority of the HARQ-ACK is high; and the above target feedback mode may be the one-shot HARQ-ACK feedback mode in response to determining that the priority of the HARQ-ACK is low.

In a possible implementation, the target feedback mode is the enhanced dynamic HARQ-ACK feedback mode in response to determining that the priority of the HARQ-ACK is a high priority and an information format of the downlink control information indicates that the corresponding downlink control information does not trigger one-shot HARQ-ACK feedback.

In a possible implementation, the target feedback mode is the one-shot HARQ-ACK feedback mode in response to determining that the priority of the HARQ-ACK is a high priority and the information format of the downlink control information indicates that the corresponding downlink control information triggers one-shot HARQ-ACK feedback.

In a possible implementation, the target feedback mode is the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band;

sending the downlink control information to the terminal includes:

sending the downlink control information to the terminal through the unlicensed frequency band; and receiving the HARQ-ACK feedback information transmitted by the terminal for the PDSCH corresponding to the downlink control information according to the target feedback mode includes:

receiving the HARQ-ACK feedback information transmitted by the terminal for the PDSCH corresponding to the downlink control information through the unlicensed frequency band according to the target feedback mode.

According to a third aspect of examples of the disclosure, a hybrid automatic repeat request-acknowledgment information transmission apparatus is provided, applied to a terminal, and including:

a downlink control information receiving module, configured to receive downlink control information sent by a base station, where the downlink control information contains a priority of hybrid automatic repeat request-acknowledgment (HARQ-ACK) information of a corresponding physical downlink shared channel (PDSCH);

a feedback mode determining module, configured to determine a target feedback mode used for performing HARQ-ACK feedback on the physical downlink shared channel (PDSCH) corresponding to the downlink control information according to the priority of the HARQ-ACK; and a feedback information transmitting module, configured to transmit corresponding HARQ-ACK feedback information to the base station according to the target feedback mode.

In some examples, the HARQ-ACK feedback mode may include an enhanced dynamic HARQ-ACK feedback mode and a one-shot HARQ-ACK feedback mode. In a possible implementation, the feedback mode determining module may determine the enhanced dynamic HARQ-ACK feedback mode as the above target feedback mode in response to determining that the priority of the HARQ-ACK is high; and the feedback mode determining module may determine the one-shot HARQ-ACK feedback mode as the above target feedback mode in response to determining that the priority of the HARQ-ACK is low.

In a possible implementation,
the feedback mode determining module is configured to determine the target feedback mode according to the priority of the HARQ-ACK and an information format of the downlink control information; where
the information format of the downlink control information is used to indicate whether the downlink control information triggers one-shot HARQ-ACK feedback.

In a possible implementation,
the feedback mode determining module is configured to determine, in response to determining that the priority of the HARQ-ACK is a high priority and the information format of the downlink control information indicates that the corresponding downlink control information does not trigger one-shot HARQ-ACK feedback, the target feedback mode as the enhanced dynamic HARQ-ACK feedback mode.

In a possible implementation,
the feedback mode determining module is configured to determine, in response to determining that the priority of the HARQ-ACK is a high priority and the information format of the downlink control information indicates that the corresponding downlink control information triggers one-shot HARQ-ACK feedback, the target feedback mode as the one-shot HARQ-ACK feedback mode.

In a possible implementation,
the feedback mode determining module is configured to determine the target feedback mode as the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band;
the downlink control information receiving module is configured to receive the downlink control information sent by the base station through the unlicensed frequency band; and
the feedback information transmitting module is configured to transmit the corresponding HARQ-ACK feedback information to the base station through the unlicensed frequency band according to the target feedback mode.

According to a fourth aspect of examples of the disclosure, a hybrid automatic repeat request-acknowledgment information transmission apparatus is provided, applied to a base station, and including:
a downlink control information sending module, configured to send downlink control information to a terminal, where the downlink control information contains a priority of hybrid automatic repeat request-acknowledgment (HARQ-ACK) information of a corresponding physical downlink shared channel (PDSCH); and
a feedback information receiving module, configured to receive HARQ-ACK feedback information transmitted by the terminal for the PDSCH corresponding to the downlink control information according to a target feedback mode, where the target feedback mode is determined according to the priority of the HARQ-ACK.

In some examples, the HARQ-ACK feedback mode may include an enhanced dynamic HARQ-ACK feedback mode and a one-shot HARQ-ACK feedback mode. In a possible implementation, the above target feedback mode may be the enhanced dynamic HARQ-ACK feedback mode in response to determining that the priority of the HARQ-ACK is high; and the above target feedback mode may be the one-shot HARQ-ACK feedback mode in response to determining that the priority of the HARQ-ACK is low.

In a possible implementation,
the target feedback mode is the enhanced dynamic HARQ-ACK feedback mode in response to determining that the priority of the HARQ-ACK is a high priority and an information format of the downlink control information indicates that the corresponding downlink control information does not trigger one-shot HARQ-ACK feedback.

In a possible implementation,
the target feedback mode is the one-shot HARQ-ACK feedback mode in response to determining that the priority of the HARQ-ACK is a high priority and the information format of the downlink control information indicates that the corresponding downlink control information triggers one-shot HARQ-ACK feedback.

In a possible implementation,
the target feedback mode is the one-shot HARQ-ACK feedback mode in response to determining that the priority of the HARQ-ACK is a low priority.

In a possible implementation, the physical downlink shared channel (PDSCH) corresponding to the downlink control information is transmitted based on an unlicensed frequency band;
the downlink control information sending module is configured to send the downlink control information to the terminal through the unlicensed frequency band;
the feedback information receiving module is configured to receive the HARQ-ACK feedback information transmitted by the terminal for the PDSCH corresponding to the downlink control information through the unlicensed frequency band according to the target feedback mode.

The technical solution provided by the examples of the disclosure may include the following beneficial effects:
in response to receiving the DCI sent by the base station, the terminal may select the target feedback mode for sending the HARQ-ACK feedback information of the PDSCH corresponding to the DCI according to the priority of the HARQ-ACK indicated by the DCI. For example, for the PDSCH with the priority of the HARQ-ACK being high, the enhanced dynamic HARQ-ACK feedback mode is used to ensure low feedback delay. For the PDSCH with the priority of the HARQ-ACK being low, the one-shot HARQ-ACK feedback mode is used to reduce signaling occupation. That is to say, the solutions shown in the examples of the present application can flexibly select, in a terminal that simultaneously supports the two feedback modes, an appropriate feedback mode to perform HARQ-ACK feedback, and thus feedback delay requirements of different services and a resource utilization rate are considered.

Those skilled in the art will easily figure out other implementation solutions of the disclosure after considering the specification and practicing the invention disclosed here. The disclosure intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are merely regarded as being for example, and the true scope and spirit of the disclosure are indicated by the following claims.

It should be understood that the disclosure is not limited to the exact structure that has been described above and shown in the accompanying drawings, and that various modifications and changes may be made without departing from the scope of the disclosure. The scope of the disclosure is limited merely by the appended claims.

What is claimed is:

1. A hybrid automatic repeat request-acknowledgment information transmission method, performed by a terminal, and comprising:
   receiving downlink control information sent by a base station, wherein the downlink control information contains a priority of hybrid automatic repeat request-acknowledgment (HARQ-ACK) information of a corresponding physical downlink shared channel (PDSCH);
   determining a target feedback mode used for performing HARQ-ACK feedback on the physical downlink shared channel (PDSCH) corresponding to the downlink control information according to the priority of the HARQ-ACK and an information format of the downlink control information, wherein the information format of the downlink control information is used to indicate whether the downlink control information triggers one-shot HARQ-ACK feedback; and
   transmitting corresponding HARQ-ACK feedback information to the base station according to the target feedback mode.

2. A non-transitory computer readable storage medium, wherein the storage medium stores an instruction, and the instruction is executed by a processor, so as to implement the hybrid automatic repeat request-acknowledgment information transmission method according to claim 1.

3. The method according to claim 1, wherein determining the target feedback mode according to the priority of the HARQ-ACK and the information format of the downlink control information comprises:
   determining, in response to determining that the priority of the HARQ-ACK is a high priority and the information format of the downlink control information indicates that the corresponding downlink control information does not trigger one-shot HARQ-ACK feedback, the target feedback mode as an enhanced dynamic HARQ-ACK feedback mode.

4. The method according to claim 1, wherein determining the target feedback mode according to the priority of the HARQ-ACK and the information format of the downlink control information comprises:
   determining, in response to determining that the priority of the HARQ-ACK is a high priority and the information format of the downlink control information indicates that the corresponding downlink control information triggers one-shot HARQ-ACK feedback, the target feedback mode as a one-shot HARQ-ACK feedback mode.

5. The method according to claim 1, wherein determining the target feedback mode according to the priority of the HARQ-ACK and the information format of the downlink control information comprises:
   determining the target feedback mode as a one-shot HARQ-ACK feedback mode in response to determining that the priority of the HARQ-ACK is a low priority.

6. The method according to claim 1, wherein the physical downlink shared channel (PDSCH) corresponding to the downlink control information is transmitted based on an unlicensed frequency band;
   receiving the downlink control information sent by the base station comprises:
   receiving the downlink control information sent by the base station through the unlicensed frequency band; and
   transmitting the corresponding HARQ-ACK feedback information to the base station according to the target feedback mode comprises:
   transmitting the corresponding HARQ-ACK feedback information to the base station through the unlicensed frequency band according to the target feedback mode.

7. A hybrid automatic repeat request-acknowledgment information transmission method, performed by a base station, and comprising:
   sending downlink control information to a terminal, wherein the downlink control information contains a priority of hybrid automatic repeat request-acknowledgment (HARQ-ACK) information of a corresponding physical downlink shared channel (PDSCH); and
   receiving HARQ-ACK feedback information transmitted by the terminal for the PDSCH corresponding to the downlink control information according to a target feedback mode, wherein the target feedback mode is determined according to the priority of the HARQ ACK and an information format of the downlink control information, wherein the information format of the downlink control information is used to indicate whether the downlink control information triggers one-shot HARQ-ACK feedback.

8. The method according to claim 7, wherein
   the target feedback mode is an enhanced dynamic HARQ-ACK feedback mode in response to determining that the priority of the HARQ-ACK is a high priority and an information format of the downlink control information indicates that the corresponding downlink control information does not trigger one-shot HARQ-ACK feedback.

9. The method according to claim 7, wherein
   the target feedback mode is a one-shot HARQ-ACK feedback mode in response to determining that the priority of the HARQ-ACK is a high priority and an information format of the downlink control information indicates that the corresponding downlink control information triggers one-shot HARQ-ACK feedback.

10. The method according to claim 7, wherein
    the target feedback mode is a one-shot HARQ-ACK feedback mode in response to determining that the priority of the HARQ-ACK is a low priority.

11. The method according to claim 7, wherein the physical downlink shared channel (PDSCH) corresponding to the downlink control information is transmitted based on an unlicensed frequency band;
    sending the downlink control information to the terminal comprises:
    sending the downlink control information to the terminal through the unlicensed frequency band; and
    receiving the HARQ-ACK feedback information transmitted by the terminal for the PDSCH corresponding to the downlink control information according to the target feedback mode comprises:

receiving the HARQ-ACK feedback information transmitted by the terminal for the PDSCH corresponding to the downlink control information through the unlicensed frequency band according to the target feedback mode.

12. A hybrid automatic repeat request-acknowledgment information transmission apparatus, applied to a base station, and comprising:
a processor, and a memory for storing an executable instruction of the processor, wherein when running the executable instruction, the processor executes steps of the hybrid automatic repeat request-acknowledgment information transmission method according to claim 7.

13. A non-transitory computer readable storage medium, wherein the storage medium stores an instruction, and the instruction is executed by a processor, so as to implement the hybrid automatic repeat request-acknowledgment information transmission method according to claim 7.

14. A hybrid automatic repeat request-acknowledgment information transmission apparatus, applied to a terminal, and comprising:
a processor, and a memory for storing an executable instruction of the processor; wherein
the processor is configured to:
receive downlink control information sent by a base station, wherein the downlink control information contains a priority of hybrid automatic repeat request-acknowledgment (HARQ-ACK) information of a corresponding physical downlink shared channel (PDSCH);
determine a target feedback mode used for performing HARQ-ACK feedback on the physical downlink shared channel (PDSCH) corresponding to the downlink control information according to the priority of the HARQ-ACK and an information format of the downlink control information, wherein the information format of the downlink control information is used to indicate whether the downlink control information triggers one-shot HARQ-ACK feedback; and
transmit corresponding HARQ ACK feedback information to the base station according to the target feedback mode.

15. The apparatus according to claim 14, wherein the processor is configured to:
determine, in response to determining that the priority of the HARQ-ACK is a high priority and the information format of the downlink control information indicates that the corresponding downlink control information does not trigger one-shot HARQ-ACK feedback, the target feedback mode as an enhanced dynamic HARQ-ACK feedback mode.

16. The apparatus according to claim 14, wherein the processor is configured to:
determine, in response to determining that the priority of the HARQ-ACK is a high priority and the information format of the downlink control information indicates that the corresponding downlink control information triggers one-shot HARQ-ACK feedback, the target feedback mode as a one-shot HARQ-ACK feedback mode.

17. The apparatus according to claim 14, wherein the processor is configured to:
determine the target feedback mode as a one-shot HARQ-ACK feedback mode in response to determining that the priority of the HARQ-ACK is a low priority.

18. The apparatus according to claim 14, wherein the physical downlink shared channel (PDSCH) corresponding to the downlink control information is transmitted based on an unlicensed frequency band;
the processor is configured to:
receiving the downlink control information sent by the base station through the unlicensed frequency band; and
transmitting the corresponding HARQ-ACK feedback information to the base station through the unlicensed frequency band according to the target feedback mode.

* * * * *

UNITED STATES PATENT AND TRADEMARK OFFICE
CERTIFICATE OF CORRECTION

PATENT NO. : 12,308,974 B2  
APPLICATION NO. : 17/911979  
DATED : May 20, 2025  
INVENTOR(S) : Yuanyuan Li Page 1 of 1

It is certified that error appears in the above-identified patent and that said Letters Patent is hereby corrected as shown below:

In the Specification  
In Column 1, Line 9, delete "appliation" and insert -- application --, therefor.  
In Column 5, Lines 16-17, delete "ultra reliability low latency (URLLC)" and insert -- ultra reliable low latency communication (URLLC) --, therefor.  
In Column 12, Line 25, delete "Accordingly, the" and insert -- Accordingly, if the --, therefor.  
In Column 16, Line 67, delete "have be" and insert -- have been --, therefor.  
In Column 20, Line 18, delete "any their combination." and insert -- or any of their combination. --, therefor.

In the Claims  
In Column 26, Line 33, in Claim 7, delete "HARQ ACK" and insert -- HARQ-ACK --, therefor.  
In Column 28, Line 3, in Claim 14, delete "HARQ ACK" and insert -- HARQ-ACK --, therefor.

Signed and Sealed this  
Twenty-second Day of July, 2025

Coke Morgan Stewart  
*Acting Director of the United States Patent and Trademark Office*